US009425668B2

(12) United States Patent
Shimano et al.

(10) Patent No.: US 9,425,668 B2
(45) Date of Patent: Aug. 23, 2016

(54) CONTROL APPARATUS-INTEGRATED DYNAMOELECTRIC MACHINE

(71) Applicant: Mitsubishi Electric Corporation, Chiyoda-ku, Tokyo (JP)

(72) Inventors: Tomoaki Shimano, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 317 days.

(21) Appl. No.: 13/864,903

(22) Filed: Apr. 17, 2013

(65) Prior Publication Data
US 2014/0152130 A1 Jun. 5, 2014

(30) Foreign Application Priority Data

Dec. 4, 2012 (JP) ................... 2012-264878

(51) Int. Cl.
*H02K 11/04* (2016.01)
*H02K 5/22* (2006.01)
(Continued)

(52) U.S. Cl.
CPC ............. *H02K 5/225* (2013.01); *H02K 11/046* (2013.01); *H02K 11/048* (2013.01); *H02K 11/225* (2016.01); *H02K 11/33* (2016.01); *H02K 3/505* (2013.01); *H02K 3/522* (2013.01)

(58) Field of Classification Search
CPC ..... H02K 11/048; H02K 5/225; H02K 21/24; H02K 11/0073; H02K 11/0084; H02K 11/04; H02K 11/05; H02K 11/046; H02K 11/49; Y10T 29/49
USPC .. 310/67 R, 68 D, 68 B, 68 R, 71, 70 R, 152, 310/156, 153, 162, 179, 168, 268; 29/596, 29/598, 607, 609
See application file for complete search history.

(56) References Cited

U.S. PATENT DOCUMENTS 5,917,248 A * 6/1999 Seguchi et al. ................. 290/31
6,093,986 A * 7/2000 Windhorn .................... 310/68 B
(Continued)

FOREIGN PATENT DOCUMENTS

JP 2010-104205 A 5/2010
JP 2011-131775 A 7/2011
(Continued)

OTHER PUBLICATIONS

Japanese Office Action (Preliminary Notice of Reasons for Rejection), dated Jan. 7, 2014, Patent Application No. 2012-264878.

*Primary Examiner* — Burton Mullins
(74) *Attorney, Agent, or Firm* — Sughrue Mion, PLLC

(57) ABSTRACT

Provided is a control apparatus-integrated dynamoelectric machine in which, when an abnormality is found in a control apparatus in a final fabrication step, the control apparatus with the abnormality can be easily replaced by a normal one. The control apparatus-integrated dynamoelectric machine includes: a generator-motor portion including: a rotary shaft rotatably supported by a bracket; a rotor; a stator; and a rotation sensor; a control apparatus including: a DC-AC power interconverting circuit portion including: a power module for supplying AC power to a stator winding; and a field module for allowing a DC current to flow through a field winding; and a control circuit portion for controlling the DC-AC power interconverting circuit portion; and a connecting board provided outside of the bracket, for electrically connecting the control apparatus provided outside of the bracket and the generator-motor portion through a board terminal formed by insert molding.

9 Claims, 9 Drawing Sheets

(51) Int. Cl.
*H02K 3/50* (2006.01)
*H02K 3/52* (2006.01)

(56) References Cited

U.S. PATENT DOCUMENTS

| | | | |
|---|---|---|---|
| 2003/0042813 A1* | 3/2003 | Morikaku et al. | 310/91 |
| 2003/0137295 A1* | 7/2003 | Akutsu et al. | 324/207.25 |
| 2004/0140731 A1* | 7/2004 | Kometani et al. | 310/263 |
| 2004/0174089 A1* | 9/2004 | Maeda et al. | 310/263 |
| 2004/0232793 A1* | 11/2004 | Fujita et al. | 310/156.43 |
| 2005/0168216 A1* | 8/2005 | Akutsu et al. | 324/207.25 |
| 2007/0103101 A1* | 5/2007 | Kikuchi et al. | 318/140 |

FOREIGN PATENT DOCUMENTS

| | | |
|---|---|---|
| JP | 2011-239542 A | 11/2011 |
| WO | 2006-109714 A | 10/2006 |

* cited by examiner

CONTROL APPARATUS-INTEGRATED DYNAMOELECTRIC MACHINE

BACKGROUND OF THE INVENTION

1. Field of the Invention

The present invention relates to a control apparatus-integrated dynamoelectric machine including a control apparatus including a DC-AC power interconverting circuit and a control circuit portion for controlling the DC-AC power interconverting circuit, and a generator-motor portion having a generator function and a motor function, which are integrated as one body.

2. Description of the Related Art

The following control apparatus-integrated dynamoelectric machine for a vehicle has been conventionally known. The control apparatus-integrated dynamoelectric machine for a vehicle includes: a generator-motor portion including a housing made of a metal, which includes a front bracket and a rear bracket, a rotor fixedly mounted to a shaft rotatably supported by the front bracket and the rear bracket so as to be rotatably disposed in the housing, a cylindrical stator core disposed so as to be interposed between the front bracket and the rear bracket so as to surround the rotor, and a stator including a stator winding wound around the stator core; and a control apparatus including a DC-AC power interconverting circuit portion for allowing a current to flow through the stator winding and a control circuit portion for controlling the DC-AC power interconverting circuit portion, the control apparatus being disposed inside the rear bracket.

In the control apparatus-integrated dynamoelectric machine for a vehicle having the configuration described above, the control apparatus is disposed inside the rear bracket. Therefore, for example, when an abnormality is found in the control apparatus in the final fabrication step, the control apparatus cannot be easily disassembled. Therefore, there is a problem in that the control apparatus and the generator-motor portion are both required to be discarded in some cases.

SUMMARY OF THE INVENTION

The present invention has been made to solve the problem described above, and therefore has an object to provide a control apparatus-integrated dynamoelectric machine including a control apparatus which can be easily replaced by a normal one when, for example, an abnormality is found in the control apparatus in a final fabrication step.

According to an exemplary embodiment of the present invention, there is provided a control apparatus-integrated dynamoelectric machine, including:

a generator-motor portion including:
a bracket;
a rotary shaft rotatably supported by the bracket;
a rotor fixedly provided to the rotary shaft inside the bracket;
a stator fixed to the bracket so as to surround the rotor; and
a rotation sensor including:
  a sensor rotor fixed to the rotary shaft; and
  a sensor stator surrounding the sensor rotor;
a control apparatus including:
a DC-AC power interconverting circuit portion including:
  a power module for supplying AC power to a stator winding of the stator; and
  a field module for allowing a DC current to flow through a field winding of the rotor; and
a control circuit portion for controlling the DC-AC power interconverting circuit portion; and
a connecting board provided outside of the bracket, for electrically connecting the control apparatus provided outside of the bracket and the generator-motor portion through a board terminal formed by insert molding.

According to the control apparatus-integrated dynamoelectric machine of the present invention, the control apparatus electrically connected to the generator-motor portion through the connecting board is provided outside of the bracket. Therefore, for example, when an abnormality is found in the control apparatus in the final fabrication step, the control apparatus with the abnormality can be easily replaced by a normal one.

DETAILED DESCRIPTION OF THE PREFERRED EMBODIMENTS

Figure 1:
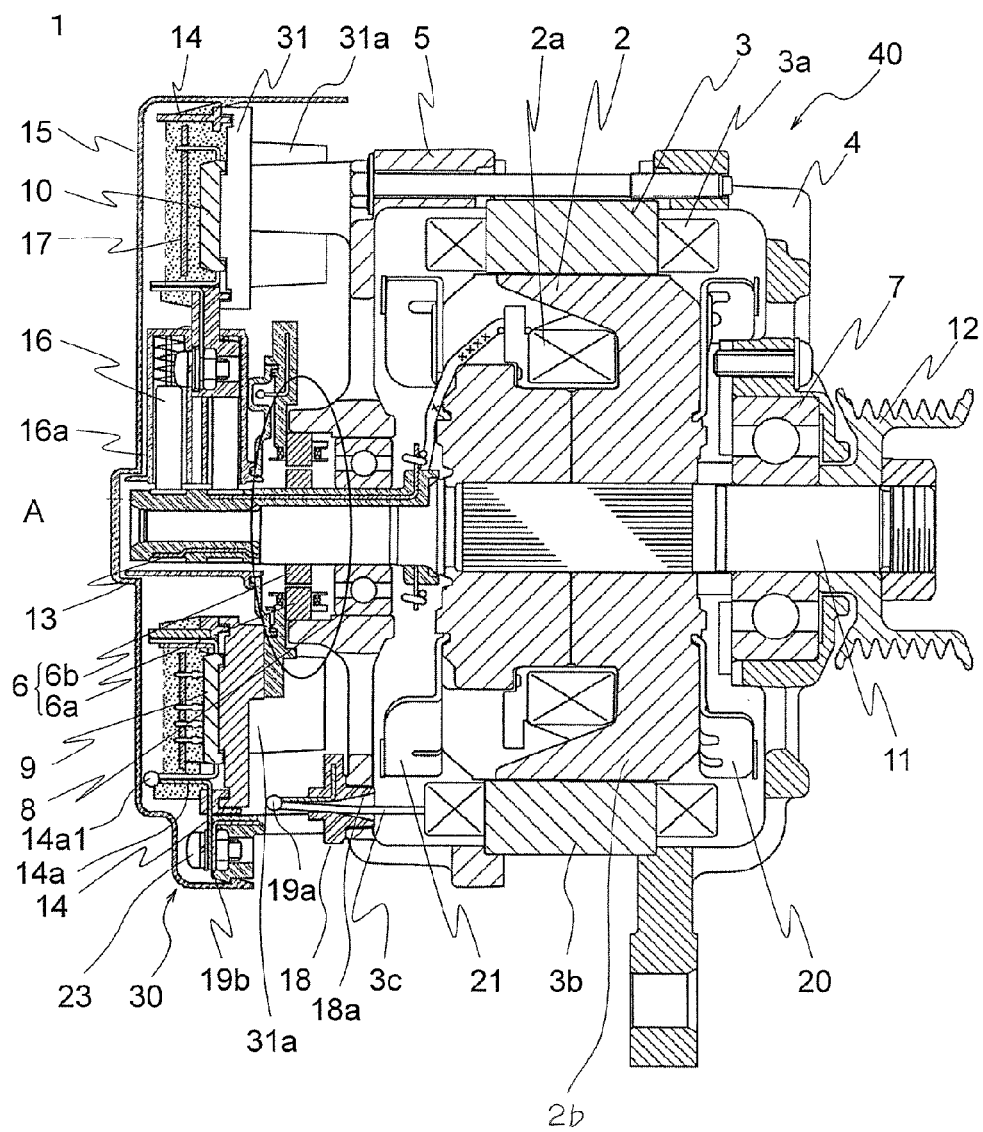
FIG. 1 is a sectional view of a control apparatus-integrated dynamoelectric machine for a vehicle according to a first embodiment of the present invention.

In the following, a control apparatus-integrated dynamoelectric machine for a vehicle according to each of embodiments of the present invention is described referring to the accompanying drawings. In the drawings, the same or equivalent members and parts are denoted by the same reference symbols for description.

First Embodiment

Figure 2:
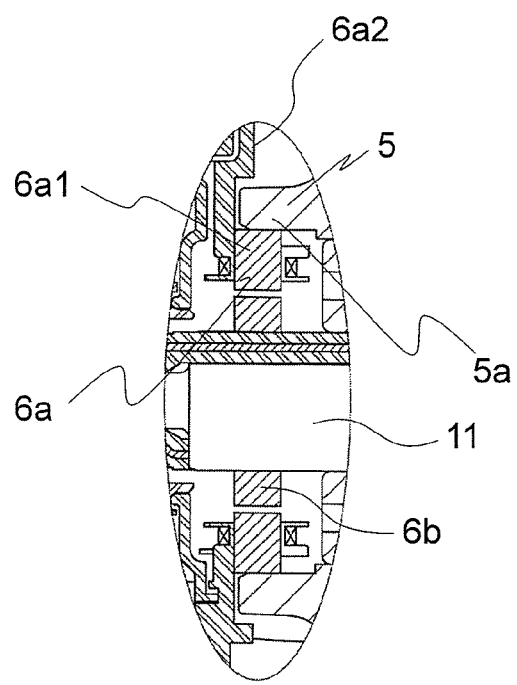
FIG. 2 is an enlarged view illustrating a portion A of FIG. 1.
Figure 3:
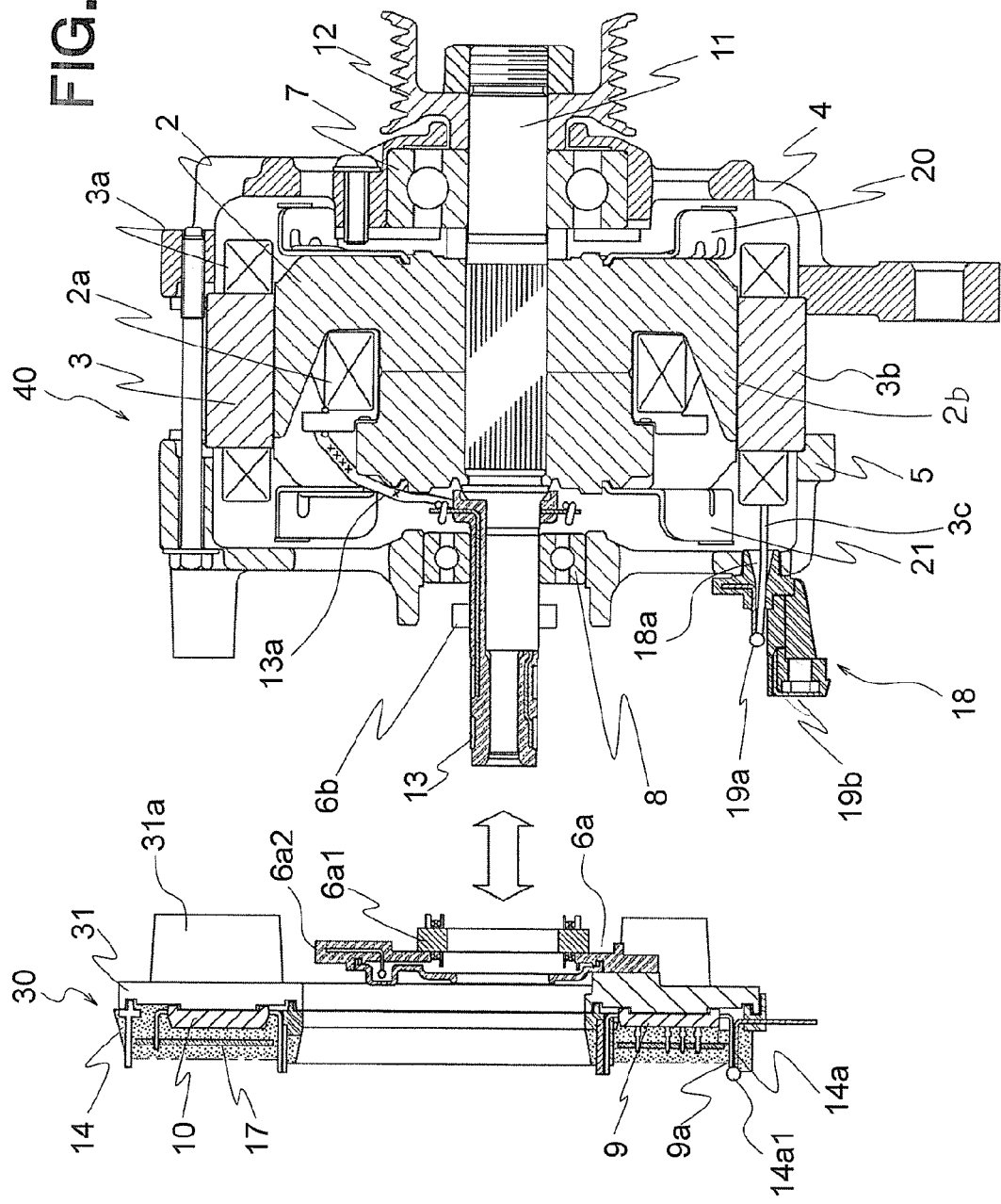
FIG. 3 is a sectional view illustrating a state before a control apparatus illustrated in FIG. 1 is mounted to a generator-motor portion or after the control apparatus is removed therefrom.
Figure 4:
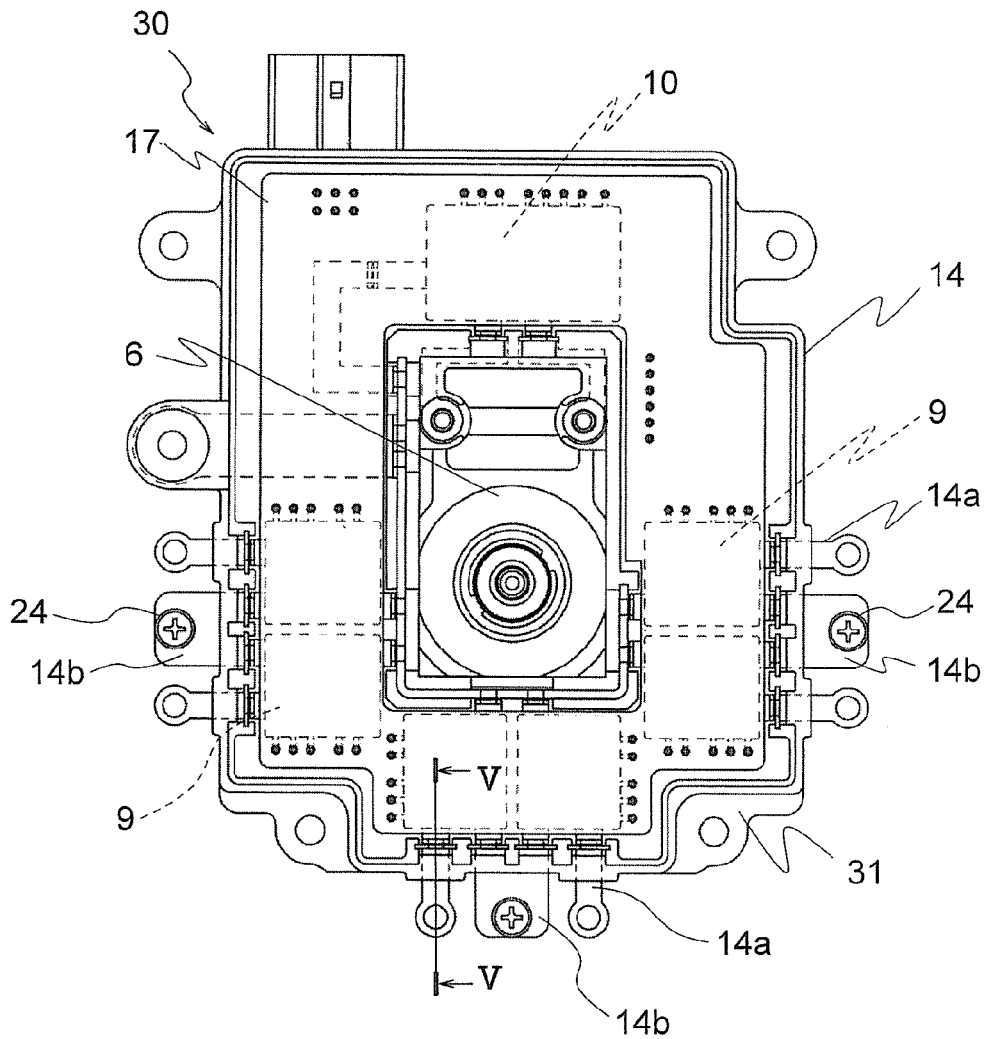
FIG. 4 is a front view illustrating the control apparatus illustrated in FIG. 1.
Figure 5:
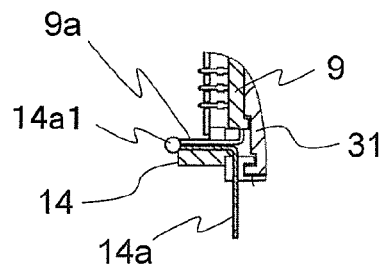
FIG. 5 is a sectional view taken along the line V-V of FIG. 4 as viewed from the direction indicated by the arrows.
Figure 6:
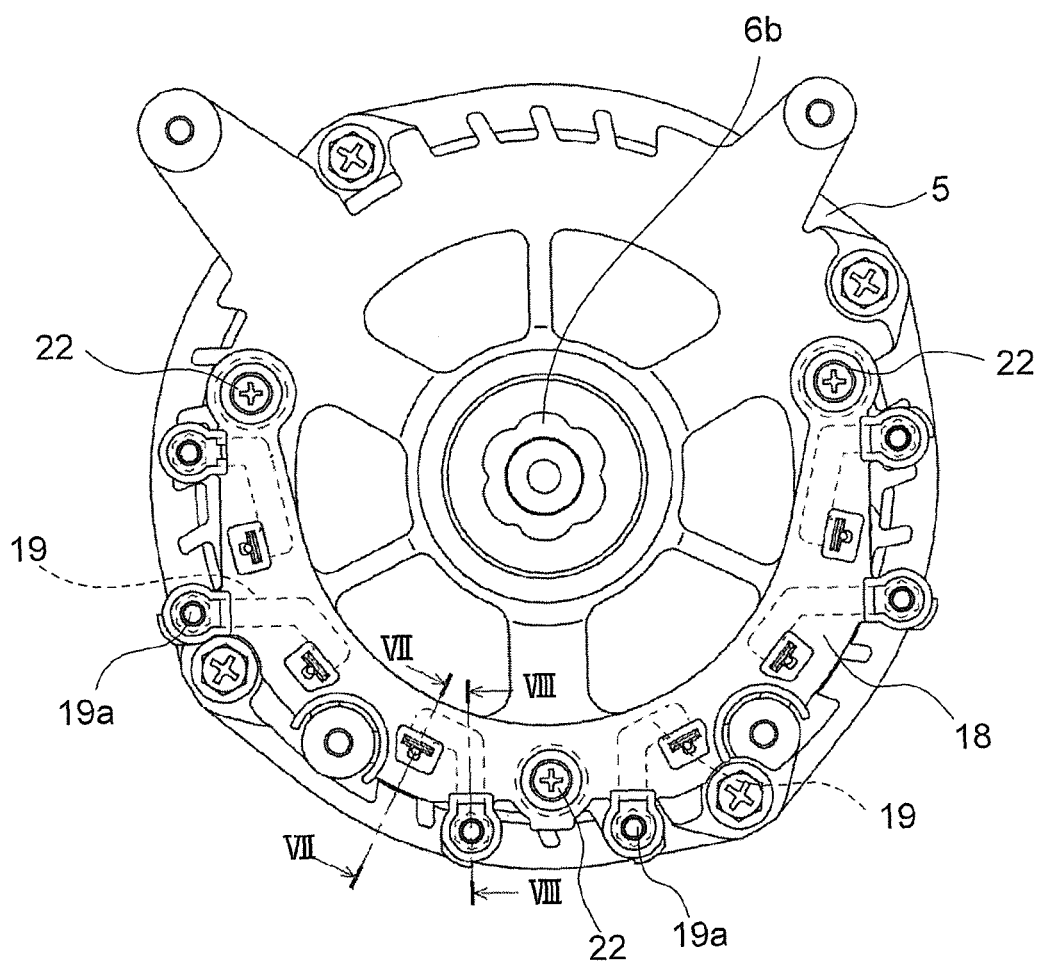
FIG. 6 is a front view of the generator-motor portion illustrated in FIG. 1, as viewed from the rear side.
Figure 7:
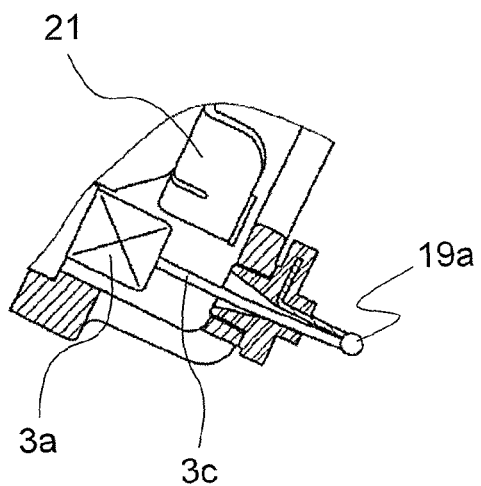
FIG. 7 is a sectional view taken along the line VII-VII of FIG. 6, as viewed from the direction indicated by the arrows.
Figure 8:
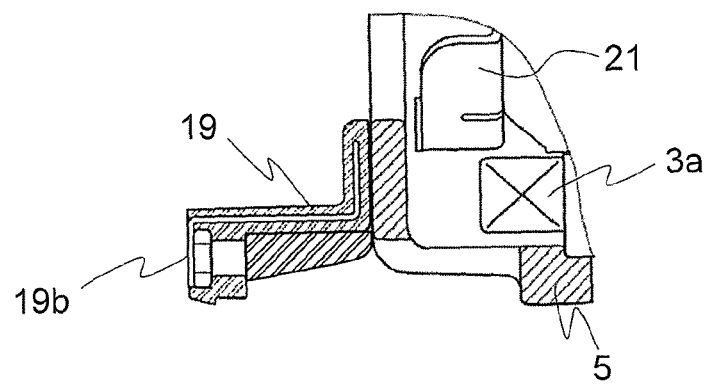
FIG. 8 is a sectional view taken along the line VIII-VIII of FIG. 6, as viewed from the direction indicated by the arrows.

FIG. 1 is a sectional view of a control apparatus-integrated dynamoelectric machine for a vehicle (hereinafter abbreviated as "dynamoelectric machine") 1 according to a first embodiment of the present invention, FIG. 2 is an enlarged view illustrating a portion A of FIG. 1, FIG. 3 is a sectional view illustrating a state before a control apparatus 30 illustrated in FIG. 1 is mounted to a generator-motor portion 40 or after the control apparatus 30 is removed therefrom, FIG. 4 is a front view illustrating the control apparatus 30 illustrated in FIG. 1, FIG. 5 is a sectional view taken along the line V-V of FIG. 4 as viewed from the direction indicated by the arrows, FIG. 6 is a front view of the generator-motor portion 40 illustrated in FIG. 1, as viewed from the rear side, FIG. 7 is a sectional view taken along the line VII-VII of FIG. 6, as viewed from the direction indicated by the arrows, and FIG. 8 is a sectional view taken along the line VIII-VIII of FIG. 6, as viewed from the direction indicated by the arrows.

The dynamoelectric machine 1 includes the generator-motor portion 40, the control apparatus 30, and a connecting board 18 which electrically connects the control apparatus 30 and the generator-motor portion 40 to each other.

The generator-motor portion 40 includes a bracket, a rotor 2, and a stator 3. The bracket includes a front bracket 4 and a rear bracket 5. The rotor 2 is housed within the bracket, and includes a rotary shaft 11 whose both ends are rotatably supported through an intermediation of bearings 7 and 8 by the front bracket 4 and the rear bracket 5, respectively. The stator 3 is provided on the outer side of the rotor 2 so as to surround the rotor 2, and is interposed between the front bracket 4 and the rear bracket 5 so as to be fixed therebetween.

The generator-motor portion 40 includes a rotation sensor 6, slip rings 13, and a pair of brushes 16. The rotation sensor 6 detects a rotating state of the rotor 2 through an intermediation of the rotary shaft 11. The slip rings 13 are provided to a distal end portion of the rotary shaft 11, which projects from the rear bracket 5. The pair of brushes 16 is housed inside a brush holder 16a. The brushes 16 have distal end surfaces which are respectively held in sliding contact with the slip rings 13.

The rotor 2 includes a field core 2b and a field winding 2a which is wound around the field core 2b. A fan 20 for generating cooling air is mounted to one end surface of the field core 2b, whereas a fan 21 for similarly generating cooling air is mounted to another end surface thereof.

The field winding 2a is electrically connected to the slip rings 13 through connecting wires 13a. A field current from the brushes 16 flows through the field winding 2a through the slip rings 13.

The stator 3 includes a stator core 3b and a three-phase stator winding 3a wound around the stator core 3b.

One end portion of the rotary shaft 11 projects from the front bracket 4. A pulley 12 for transmitting and receiving a torque bidirectionally to/from an internal combustion engine (not shown) through an intermediation of a belt (not shown) is mounted to a distal end of the one end portion of the rotary shaft 11.

The rotation sensor 6 includes a sensor rotor 6b fixed to the rotary shaft 11 and a sensor stator 6a surrounding the sensor rotor 6b. A projecting portion 5a projecting along an axial direction is provided to the rear bracket 5. As illustrated in FIG. 2, an outer diameter surface of a core portion 6a1 of the sensor stator 6a is fitted so as to be held in contact with an inner diameter surface of the projecting portion 5a.

The connecting board 18 having a semi-ring-like shape includes board terminals 19, which are formed by insert molding. The connecting board 18 is fixed to the rear bracket 5 by a plurality of screws 22. Through holes 18a are formed in the connecting board 18 at six positions along a circumferential direction.

A distal end portion of each of lead wires 3c extending in the axial direction of the stator 3 passes through a corresponding one of the through holes 18a. The distal end portion of each of the lead wires 3c is electrically connected to a connection portion 19a of a corresponding one of the board terminals 19.

The control apparatus 30 includes a DC-AC power interconverting circuit portion and a control circuit portion 17. The DC-AC power interconverting circuit portion supplies AC power to the stator winding 3a and allows a DC current to flow through the field winding 2a. The control circuit portion 17 controls the DC-AC power interconverting circuit portion.

The DC-AC power interconverting circuit portion includes power modules 9, a field module 10, a heat sink 31 for cooling, a case 14. The power modules 9 supply the AC power to the stator winding 3a. The field module 10 allows the DC current to flow through the field winding 2a. The heat sink 31, on which the power modules 9 and the field module 10 are mounted, includes radiating fins 31a. The case 14 includes case terminals 14a, which are respectively electrically connected to terminals 9a of the power modules 9 and terminals of the field module 10 and are formed by insert molding. The control circuit portion 17 controls the power modules 9 and the field module 10.

Each of the power modules 9 and the field module 10 is formed by mounting switching elements or the like on a lead frame for wiring and is then integrated by resin molding using insert molding.

The control apparatus 30 is covered with a protective cover 15 whose peripheral edge portion is locked to the connecting board 18 by snap-fitting.

In FIG. 4, the illustration of a resin material, which covers the power modules 9 and the field module 10 housed inside the case 14, is omitted.

The case terminals 14a of the case 14 and the terminals 9a of the power modules 9 are connected by welding at connection portions 14a1. The board terminals 19 of the connecting board 18 and the lead wires 3c of the stator 3 are connected by welding at the connection portions 19a.

The sensor stator 6a of the rotary sensor 6 is mounted to the heat sink 31 by a resin portion 6a2. A signal wiring (not shown) led from the sensor stator 6a is electrically connected to the control circuit portion 17.

Next, a procedure of assembly of the dynamoelectric machine 1 having the configuration described above is described.

First, after the sensor stator 6a is mounted onto the heat sink 31, the control apparatus 30 is mounted to the generator-motor portion 40 from the rear side thereof.

A space portion, through which the rotary shaft 11 is to pass, is formed in the center of the control apparatus 30. In the space portion, the brush holder 16a to be fixed to the control apparatus 30 is disposed.

For mounting the control apparatus 30, the distal end portions of the lead wires 3c extending in the axial direction of the stator 3 pass through the through holes 18a of the connecting board 18 so as to be fixed at the connection portions 19a of the board terminals 19 by welding.

The case terminals 14a of the case 14 of the control apparatus 30 and connecting end portions 19b of the board terminals 19 of the connecting board 18 are fixed by screws 23 so as to be electrically connected to each other, whereas ground terminals 14b of the case 14 and the heat sink 31 are fixed by screws 24 so as to be electrically connected to each other.

Next, the case terminals 14a of the case 14 and the terminals 9a of the power modules 9 are joined by welding or the like.

Then, the power modules 9 and the field module 10, and the control circuit portion 17 are electrically connected by welding or the like.

Thereafter, a melt resin is injected into the case 14 and is then cured.

As the final step, the peripheral edge portion of the cover 15 is locked to the connecting board 18 by snap-fitting so as to cover the control apparatus 30.

Next, an operation of the dynamoelectric machine 1 having the configuration described above is described.

For starting the internal combustion engine (hereinafter also referred to simply as "engine"), DC power is transmitted from a battery (not shown) to the power modules 9 of the control apparatus 30. In the power modules 9, the DC power is converted into three-phase AC power, which is then supplied to the stator winding 3a.

On the other hand, the field current controlled by the field module 10 is supplied to the brushes 16, the slip rings 13, the connecting wires 13a, and the field winding 2a so as to apply a rotating field to the field winding 2a of the rotor 2, thereby rotationally driving the rotor 2.

A rotation torque of the rotor 2 is transmitted to the internal combustion engine through the rotary shaft 11, the pulley 12, and the belt so as to ignite and start the engine.

On the other hand, when the internal combustion engine is started, the rotation torque of the engine is transmitted to the generator-motor portion 40 through an intermediation of a crank pulley, a belt, and the pulley 12. As a result, the rotor 2 is rotated to induce a three-phase AC voltage in the stator winding 3a. The three-phase AC voltage is rectified into DC power by the power modules 9 so as to be supplied to the battery and a machine load.

A signal output from the rotary sensor 6 is transmitted through the signal wiring, which is led from the sensor stator 6a, to the control circuit portion 17. In the control circuit portion 17, the output signal is used for the detection of the position of rotation of the rotor 2 so as to be used as control information at the time of a power-generating operation by the dynamoelectric machine 1 and an operation for starting the engine.

As described above, according to the dynamoelectric machine 1 of the first embodiment, the control apparatus 30 is provided outside of the rear bracket 5. The case terminals 14a formed to be provided to the case 14 of the control apparatus 30 by insert molding and the connecting end portions 19b of the board terminals 19 formed to be provided to the connecting board 18 by insert molding are electrically connected to each other by the screws 23.

Therefore, for example, at the time of the fabrication step of the dynamoelectric machine 1, for example, when any one of the power modules 9 of the control apparatus 30 is broken and an abnormality is found by a characteristic check, only the control apparatus 30 with the abnormality is replaced by a normal control apparatus 30, while the generator-motor portion 40 can be continuously used without replacement. Thus, a loss in the fabrication of the dynamoelectric machine 1 can be suppressed.

Moreover, according to the dynamoelectric machine 1 of this embodiment, when the control apparatus 30 is to be assembled to the generator-motor portion 40, the control apparatus 30 can be positioned with respect to the generator-motor portion 40 by fitting the outer diameter surface of the core portion 6a1 of the sensor stator 6a so as to be held in contact with the inner diameter surface of the projecting portion 5a of the rear bracket 5. As a result, assembly accuracy is improved.

Moreover, the case terminals 14a of the case 14 of the control apparatus 30 and the terminals 9a of the power modules 9 are firmly connected to each other by welding at the connection portions 14a1, whereas the board terminals 19 of the connecting board 18 and the lead wires 3c of the stator 3 are firmly connected to each other by welding at the connection portions 19a. Therefore, simply by removing the screws 23 which connect the case terminals 14a of the case 14 of the control apparatus 30 and the board terminals 19 of the connecting board 18 to each other, the control apparatus 30 can be easily replaced.

Second Embodiment

Figure 9:
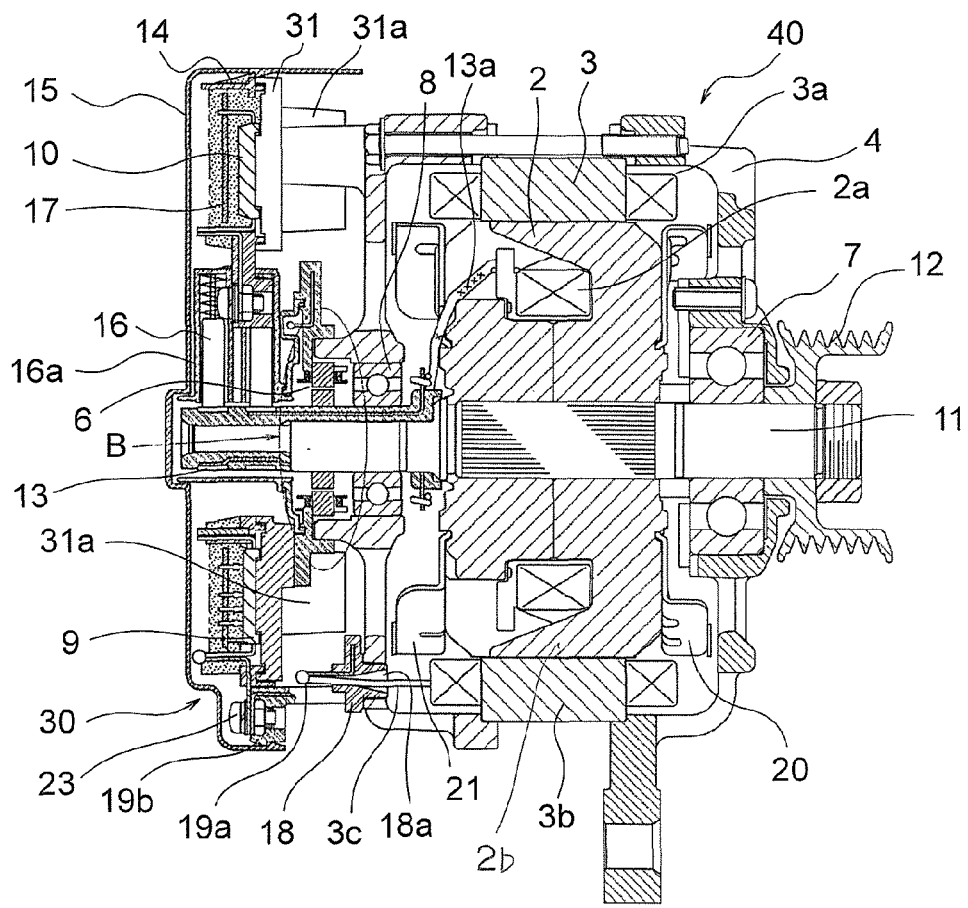
FIG. 9 is a sectional view illustrating a dynamoelectric machine 1 according to a second embodiment of the present invention.
Figure 10:
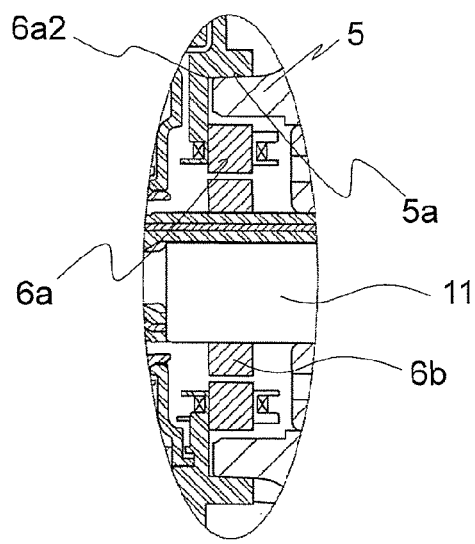
FIG. 10 is an enlarged view illustrating a portion B of FIG. 9.

FIG. 9 is a sectional view illustrating a dynamoelectric machine 1 according to a second embodiment of the present invention, and FIG. 10 is an enlarged view illustrating a portion B of FIG. 9.

In this embodiment, an inner diameter surface of the resin portion 6a2 of the sensor stator 6a is fitted so as to be held in contact with the outer diameter surface of the projecting portion 5a of the rear bracket 5 of the generator-motor portion 40.

The remaining configuration is the same as that of the dynamoelectric machine 1 of the first embodiment.

According to the dynamoelectric machine 1 of this embodiment, when the control apparatus 30 is to be assembled to the generator-motor portion 40, the inner diameter surface of the resin portion 6a2 of the sensor stator 6a is fitted so as to be held in contact with the outer diameter surface of the projecting portion 5a of the rear bracket 5 of the generator-motor portion 40, for positioning. As a result, assembly accuracy is improved.

Third Embodiment

Figure 11:
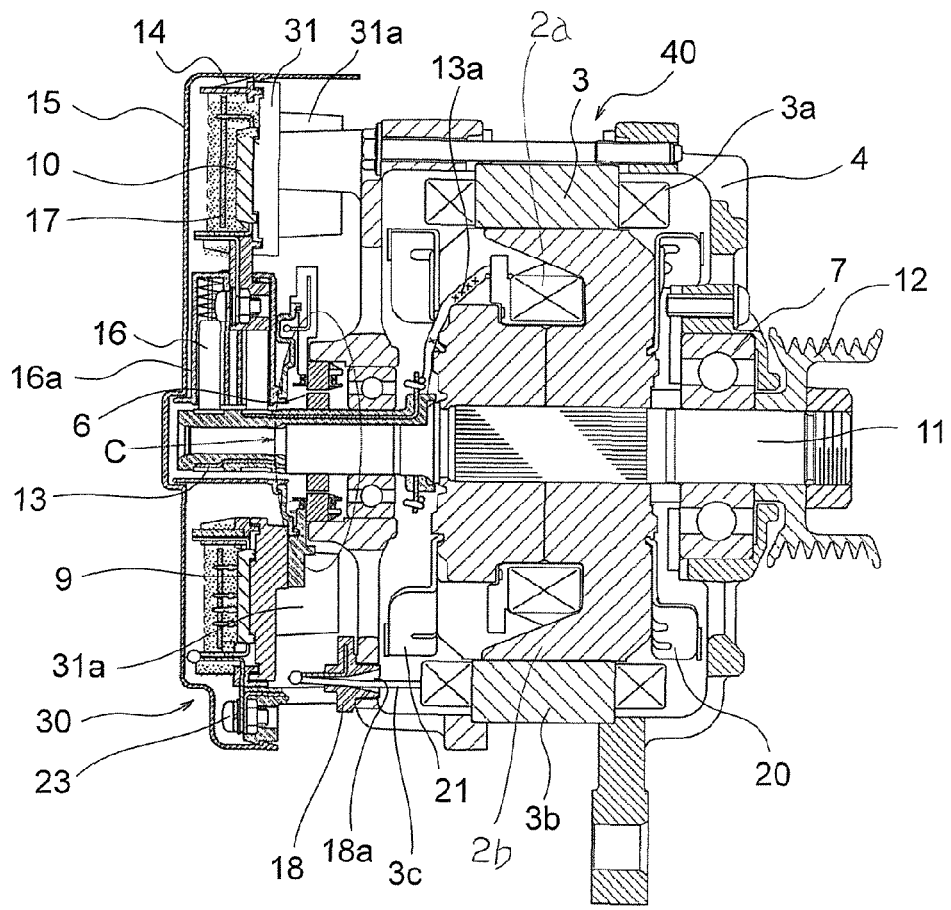
FIG. 11 is a sectional view illustrating a dynamoelectric machine 1 according to a third embodiment of the present invention.
Figure 12:
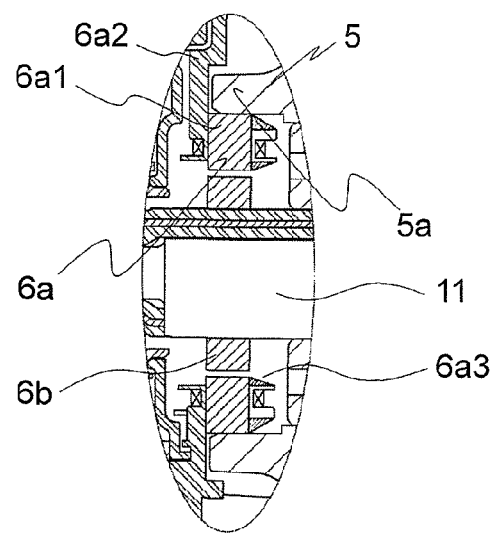
FIG. 12 is an enlarged view illustrating a portion C of FIG. 11.

FIG. 11 is a sectional view illustrating a dynamoelectric machine 1 according to a third embodiment of the present invention, and FIG. 12 is an enlarged view illustrating a portion C of FIG. 11.

In this embodiment, a guiding portion 6a3 which is tapered toward the rear bracket 5 is provided on a surface of the core portion 6a1 on the side of the rear bracket 5 over the entire circumference.

The remaining configuration is the same as that of the dynamoelectric machine 1 according to the first embodiment.

According to the dynamoelectric machine 1 of this embodiment, when the control apparatus 30 is to be assembled to the generator-motor portion 40, the outer diameter surface of the core portion 6a1 of the sensor stator 6a is smoothly guided to the inner diameter surface of the projecting portion 5a of the rear bracket 5 of the generator-motor portion 40 by the guiding portion 6a3. As a result, workability in assembly is improved.

Moreover, the contact between the core portion 6a1 of the sensor stator 6a and the sensor rotor 6b can be avoided by the guiding portion 6a3.

Fourth Embodiment

Figure 13:
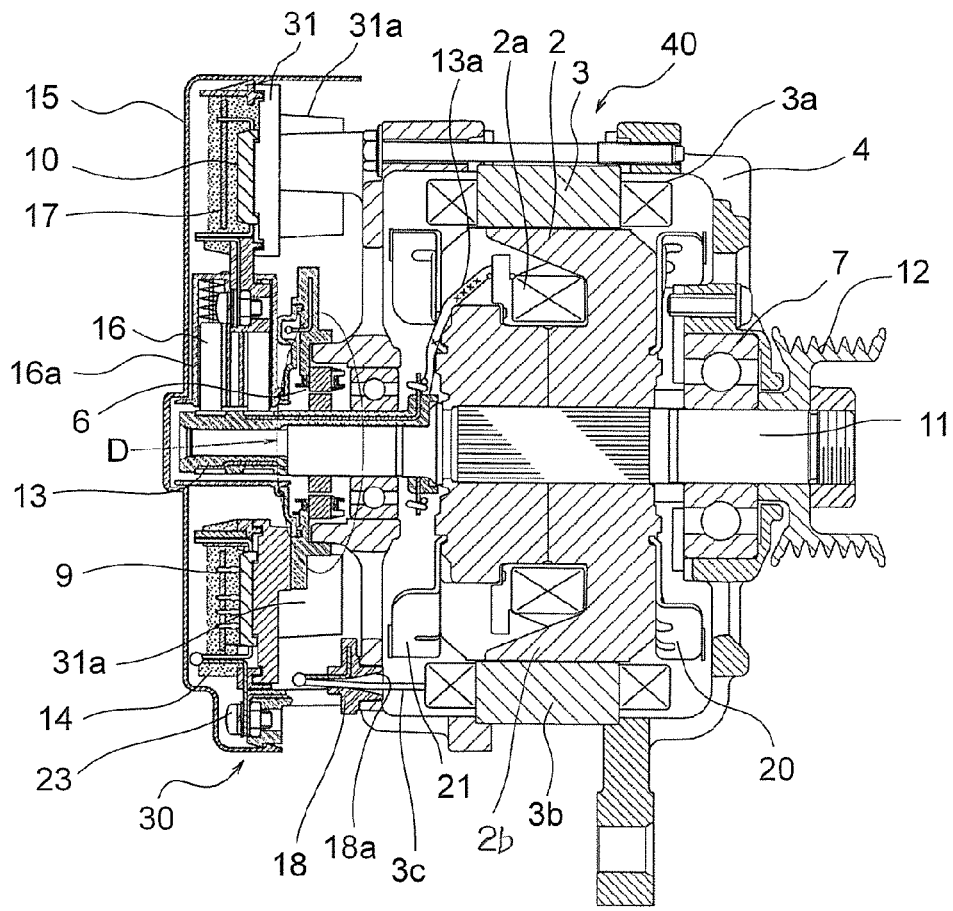
FIG. 13 is a sectional view illustrating a dynamoelectric machine 1 according to a fourth embodiment of the present invention.
Figure 14:
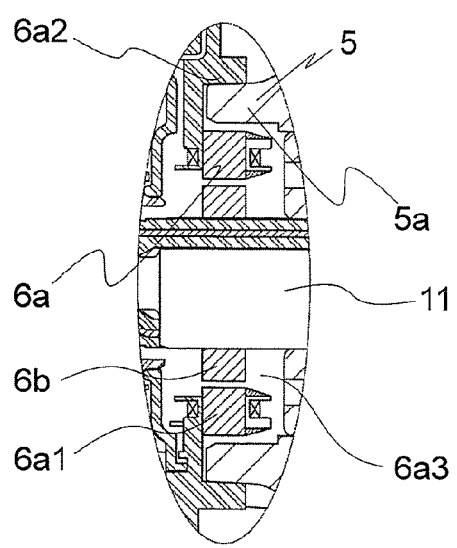
FIG. 14 is an enlarged view illustrating a portion D of FIG. 13.

FIG. 13 is a sectional view illustrating a dynamoelectric machine 1 according to a fourth embodiment of the present invention, and FIG. 14 is an enlarged view illustrating a portion D of FIG. 13.

In this embodiment, the guiding portion 6a3 which is tapered toward the rear bracket 5 is provided on the surface of the core portion 6a1 on the side of the rear bracket 5 over the entire circumference.

The remaining configuration is the same as that of the dynamoelectric machine 1 according to the second embodiment.

According to the dynamoelectric machine 1 of this embodiment, when the control apparatus 30 is to be assembled to the generator-motor portion 40, the inner diameter surface of the resin portion 6a2 of the sensor stator 6a is smoothly guided to the outer diameter surface of the projecting portion 5a of the rear bracket 5 of the generator-motor portion 40 by the guiding portion 6a3. As a result, workability in assembly is improved.

Moreover, the contact between the core portion 6a1 of the sensor stator 6a and the sensor rotor 6b can be avoided by the guiding portion 6a3.

Although the control apparatus-integrated dynamoelectric machine for a vehicle has been described in each of the embodiments above, it is apparent that the application of the present invention is not limited thereto. For example, the present invention is also applicable to a control apparatus-integrated dynamoelectric machine for an outboard engine.

What is claimed is:

1. A control apparatus-integrated dynamoelectric machine, comprising:
   a generator-motor portion comprising:
      a bracket;
      a rotary shaft rotatably supported by the bracket;
      a rotor fixedly provided to the rotary shaft inside the bracket;
      a stator fixed to the bracket so as to surround the rotor; and
      a rotation sensor comprising:
         a sensor rotor fixed to the rotary shaft; and
         a sensor stator surrounding the sensor rotor;
   a control apparatus comprising:
      a DC-AC power interconverting circuit portion comprising:
         a power module for supplying AC power to a stator winding of the stator; and
         a field module for allowing a DC current to flow through a field winding of the rotor; and
      a control circuit portion for controlling the DC-AC power interconverting circuit portion; and
   a connecting board provided outside of the bracket, for electrically connecting the control apparatus provided outside of the bracket and the generator-motor portion through a board terminal formed by insert molding, wherein the connecting board is separate from the control apparatus.

2. A control apparatus-integrated dynamoelectric machine according to claim 1, wherein:
   the DC-AC power interconverting circuit portion comprises a case for housing the power module and the field module therein, the case being electrically connected to the power module and the field module through a case terminal formed by insert molding; and
   the case terminal is electrically connected to the board terminal by a screw.

3. A control apparatus-integrated dynamoelectric machine according to claim 2, wherein the case terminal and a terminal of the power module are connected at a connection portion by welding, whereas the board terminal and a lead wire of the stator winding are connected at a connection portion by welding.

4. A control apparatus-integrated dynamoelectric machine according to claim 1, wherein an outer diameter surface of a core portion of the sensor stator mounted to the control apparatus is fitted so as to be held in contact with an inner diameter surface of a projecting portion of the bracket, the projecting portion projecting in an axial direction of the bracket.

5. A control apparatus-integrated dynamoelectric machine according to claim 4, further comprising a guiding portion tapered toward the bracket, the guiding portion being provided on a surface of the core portion on the bracket side.

6. A control apparatus-integrated dynamoelectric machine according to claim 1, wherein an inner diameter surface of a resin portion of the sensor stator mounted to the control apparatus is fitted so as to be held in contact with an outer diameter surface of a projecting portion of the bracket, the projecting portion projecting in an axial direction of the bracket.

7. A control apparatus-integrated dynamoelectric machine according to claim 1, wherein the control apparatus-integrated dynamoelectric machine comprises a control apparatus-integrated dynamoelectric machine for a vehicle, for transmission and reception of a torque between the rotor and an internal combustion engine through an intermediation of a pulley fixed to an end of the rotary shaft, the end being on a side opposite to the control apparatus.

8. A control apparatus-integrated dynamoelectric machine according to claim 1, wherein the board terminal is welded to lead wires extending from the stator and the terminals of the control apparatus are fixed to the board terminal using a screw.

9. A control apparatus-integrated dynamoelectric machine, comprising:
   a generator-motor portion comprising:
      a bracket;
      a rotary shaft rotatably supported by the bracket;
      a rotor fixedly provided to the rotary shaft inside the bracket;
      a stator fixed to the bracket so as to surround the rotor; and
      a rotation sensor comprising:
         a sensor rotor fixed to the rotary shaft; and
         a sensor stator surrounding the sensor rotor;
   a control apparatus comprising:
      a DC-AC power interconverting circuit portion comprising:
         a power module for supplying AC power to a stator winding of the stator; and
         a field module for allowing a DC current to flow through a field winding of the rotor; and
      a control circuit portion for controlling the DC-AC power interconverting circuit portion; and
   a connecting board provided outside of the bracket, for electrically connecting the control apparatus provided outside of the bracket and the generator-motor portion through a board terminal formed by insert molding, wherein the control apparatus is removably attached to the connecting board.

* * * * *